US009081473B2

(12) United States Patent
Nordstrom et al.

(10) Patent No.: US 9,081,473 B2
(45) Date of Patent: Jul. 14, 2015

(54) INDICATING AN OBJECT AT A REMOTE LOCATION

(71) Applicant: Google Inc., Mountain View, CA (US)

(72) Inventors: Paul G. Nordstrom, Seattle, WA (US); Matthew Amacker, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 189 days.

(21) Appl. No.: 13/853,501

(22) Filed: Mar. 29, 2013

(65) Prior Publication Data

US 2014/0281968 A1    Sep. 18, 2014

Related U.S. Application Data

(60) Provisional application No. 61/784,372, filed on Mar. 14, 2013.

(51) Int. Cl.
*G06F 13/00* (2006.01)
*G06F 15/00* (2006.01)
*G06F 3/0481* (2013.01)
*G09B 19/24* (2006.01)

(52) U.S. Cl.
CPC .............. *G06F 3/0481* (2013.01); *G09B 19/24* (2013.01)

(58) Field of Classification Search
CPC .............................. G06F 3/0481; G09B 19/24
USPC ................. 715/781, 709, 761–765, 741, 748, 715/851–853
See application file for complete search history.

(56) References Cited

U.S. PATENT DOCUMENTS

| 5,719,622 A * | 2/1998 | Conway ..................... 348/211.8 |
| 2010/0225450 A1 | 9/2010 | Fischer et al. |
| 2011/0010644 A1* | 1/2011 | Merrill et al. .................. 715/762 |

FOREIGN PATENT DOCUMENTS

EP    2 267 595    12/2010

OTHER PUBLICATIONS

International Search Report and Written Opinion in International Application No. PCT/US2014/019271, mailed Jul. 30, 2014, 10 pages.
Kim, Si-Jung et al. 'An Interactive User Interface for Computer-Based Education: The "Laser Shot System"', 2004, 5 pages, Korea Visuals Co., Republic of Korea.

(Continued)

*Primary Examiner* — Kevin Nguyen
(74) *Attorney, Agent, or Firm* — Fish & Richardson P.C.

(57) ABSTRACT

Methods, systems, and apparatus, including computer programs encoded on a computer storage medium, for identifying an object. In one aspect, a method includes receiving an image of a first location. The image depicts a layout of objects located at the first location and a visual code for each object. A user interface is generated for the first location using the image and the codes. The user interface depicts the objects and a user interface element for each visual code. Each user interface element is selectable to identify the object associated with the visual code. The user interface is provided for display at a second location. Selection data is received that specifies a selection of a particular user interface element. Command data is sent to a computer located at the first location, which causes the computer to highlight the object associated with the visual code of the selected user interface element.

20 Claims, 5 Drawing Sheets

(56) References Cited

OTHER PUBLICATIONS

Costanzo, Alessandra et al. "Merging RFID, visual and gesture recognition technologies to generate and manage smart environments", 2011, pp. 521-526, IEEE International Conference on RFID-Technologies and Applications, University of Bologna, Italy.

Gomez, Javier et al., "Towards automatically-generated user interfaces for Ambient Intelligence Environments from 2D codes", 2009, 5 pages, Universidad Autonoma de Madrid.

Jang, Sung Hyun, "A QR Code-based Indoor Navigation System Using Augmented Reality," 2012, 7 pages, Centre for Advanced Spatial Analysis, University College London, UK.

* cited by examiner

INDICATING AN OBJECT AT A REMOTE LOCATION

CROSS REFERENCE TO RELATED APPLICATIONS

This application claims the benefit under 35 U.S.C. §119(e) of U.S. Provisional Patent Application No. 61/784,372 filed on Mar. 14, 2013, entitled "INDICATING AN OBJECT AT A REMOTE LOCATION," the entire content of which is hereby incorporated by reference.

BACKGROUND

This specification relates to pointing out an object at a remote location.

In many contexts, service providers, tutors, and other entities provide assistance or instruction to users from remote locations. For example, an Internet service provider may have a customer reset a router while diagnosing an issue with the customer's Internet service. This assistance is typically provided over a telephone or another two way communication device. In many cases, it can be difficult for the assistance provider to clearly direct the user to the appropriate object or to explain to the user what needs to be performed.

SUMMARY

In general, one innovative aspect of the subject matter described in this specification can be embodied in methods that include the actions of receiving an image of a first location, the image depicting a layout of objects located at the first location and, for at least one object, a visual code associated with the object; generating a user interface for the first location using the received image and the visual codes depicted in the image, the user interface depicting the layout of objects and a user interface element for each visual code, each user interface element being selectable to identify the object associated with the visual code; providing the user interface for display at a display located at a second location, the second location being remote from the first location; receiving selection data specifying a selection of a particular user interface element displayed in the user interface; and sending command data to a computer located at the first location in response to receiving the selection data, the command data causing the computer to highlight the object associated with the visual code of the selected user interface element. Other embodiments of this aspect include corresponding systems, apparatus, and computer programs, configured to perform the actions of the methods, encoded on computer storage devices.

These and other embodiments can each optionally include one or more of the following features. The computer can highlight the object associated with the visual code of the selected user interface element by activating an indicator for the object. The indicator can include a light positioned near the object associated with the visual code of the selected user interface element.

Generating the user interface for the first location using the received image and the visual codes depicted in the image can include for each particular object: identifying the visual code for the particular object in the image; generating a user interface element for the particular object in response to identifying the visual code for the particular object; positioning the user interface element for the particular object near a depiction of the particular object in the user interface; and associating the user interface element with an indicator for the particular object.

The command data can include data identifying the indicator associated with the selected user interface element. The command data can include data identifying the visual code of the selected user interface element. The computer can identify the indicator associated with the object based on the visual code identified by the command data. The computer can activate the indicator in response to identifying the indicator.

Generating the user interface for the first location using the received image and the visual codes depicted in the image can include detecting the objects in the received image; and providing a label for each detected object in the user interface. The visual code can include a Quick Response Code.

Providing the user interface for display at a display located at a second location can include providing data to a second computer located at the second location, the second computer displaying the user interface. Aspects can further include receiving an image that depicts a portion of the first location, the image further depicting each object associated with one of the user interface elements; and generating the user interface using the received image.

The indicator can include a laser. The command data can cause the laser to direct a beam at the object associated with the visual code of the selected user interface element. Aspects can further include detecting a position of the laser's beam in an image of the first location; and updating the command data based on the detected position.

Particular embodiments of the subject matter described in this specification can be implemented so as to realize one or more of the following advantages. A user can more easily and more quickly direct another user's attention to an object. Training and other interactive sessions can be held more quickly and more efficiently by identifying objects needed for the session in advance and by better directing users' attention to the object needed at a particular time.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

A system can enable users to point out objects at a remote location. For example, the system may be used during interactive sessions where a user at a particular location is instructing another user at another location remote from the particular location on how to accomplish a task. The system makes it easier for the user to point out objects, such as tools, to the other user. For example, rather than the user attempting to describe the object vocally in a way that the other user may understand, the system allows the user to simply activate an indicator element that identifies the correct object.

In some implementations, indicator elements can be placed about a workspace near tools or other objects that are to be used during an interactive session. These indicator elements may each include a visual code, such as a Quick Response (QR) Code, or other identifiable object, a wireless communication device, and an indicator, such as a light or speaker. The system can receive an image or video feed of the workspace with the indicator elements and generate a user interface based on the image and the visual codes. The user interface can include a selectable user interface element for each visual code, and thus for each object. When the user interface element for one of the indicator elements is selected, a command can be sent to the one indicator element that causes the indicator element to activate its indicator.

In some implementations, a laser or other light source is used to highlight selected objects or locations. When the user interface element for an object, or a position of a user interface depicting the object, is selected, the system can direct the laser such that its beam highlights the selected object. A feedback loop can be used to ensure that the laser highlights the correct object or location.

Example Operating Environment

Figure 1:
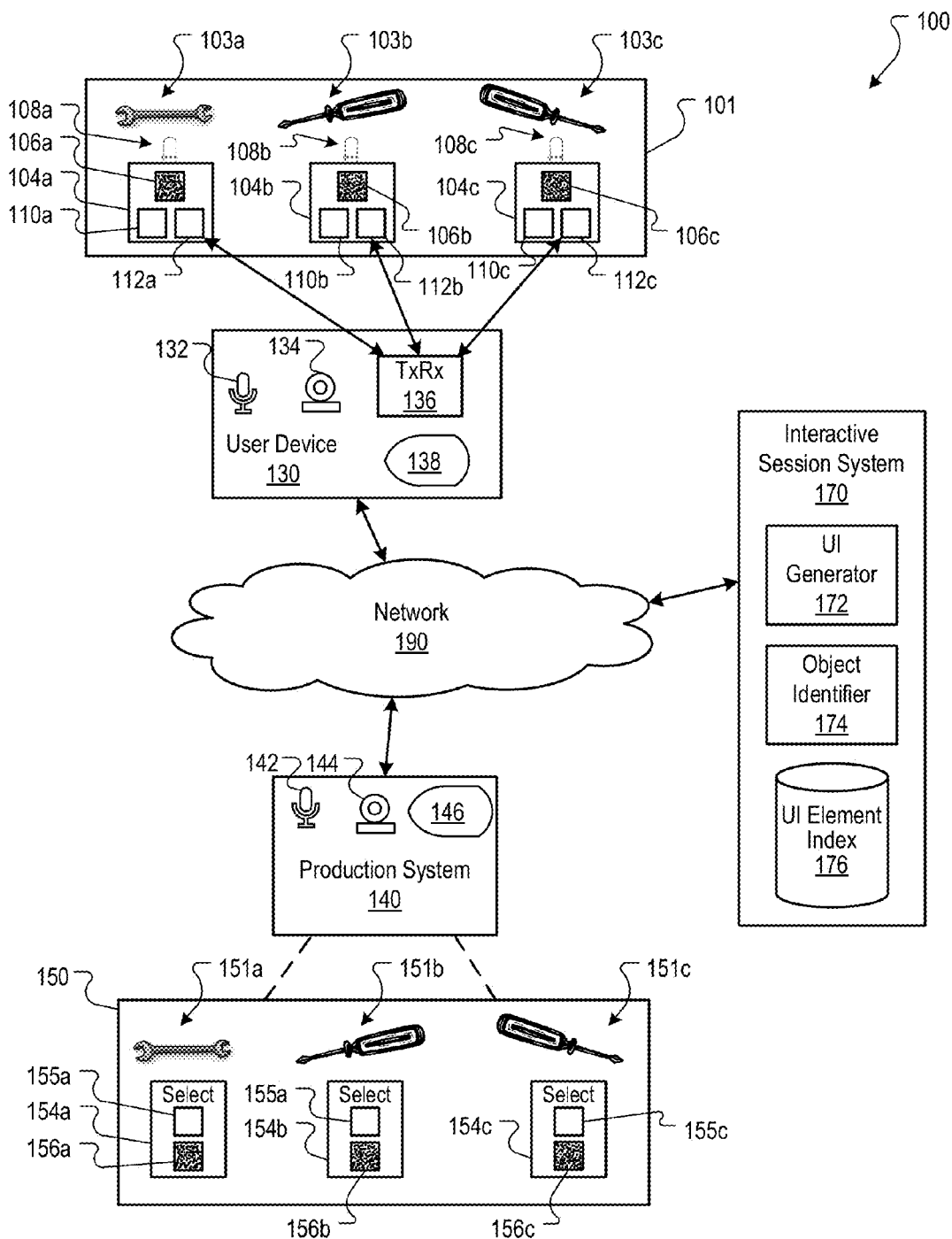
FIG. 1 is an example environment in which an interactive session system provides a user interface for identifying objects at a remote location.

FIG. 1 is an example environment 100 in which an interactive session system 170 provides a user interface for identifying objects at a remote location. A data communication network 190 enables data communication between multiple electronic devices. Users can access content, provide content, exchange information, and participate in conversations and interactive sessions by way of the devices and systems that can communicate with each other over the network 190. The network 190 can include, for example, a local area network (LAN), a cellular phone network, a wide area network (WAN), e.g., the Internet, or a combination of them.

A user device 130 is an electronic device, or collection of devices, that is capable of communicating over the network 190. Example user devices 130 include personal computers, mobile communication devices, smart glasses, and other devices that can send and receive data over the network 190. A user device 130 typically includes a user application, e.g., a web browser that sends and receives data over the network 190, generally in response to user actions. The web browser can enable a user to display and interact with text, images, videos, music and other information typically located on a web page at a website on the world wide web or a local area network.

In general, a user device 130 can include an audio input device 132, a video input device 134 and/or still image input device, a wireless communication device 136, an optional display device 138, and/or optionally other input devices and output devices. The audio input device 132 can enable a user to communicate with another user over the network 190. The video input device 134 can capture a video stream and/or still images, for example of a workspace 101. The video input device 134 may include a depth camera that can generate three dimensional images.

The wireless communication device 136 can include a wireless transceiver for communicating wirelessly with other devices. For example, the wireless communication device 136 can include a modem, a Wi-Fi transceiver, a Bluetooth transceiver, a Zigbee transceiver, and/or other wireless communication module. The term "transceiver" is used in this specification to refer to a transmitter and/or receiver.

An interactive session system 170 is also accessible by user devices 130 over the network 190. The interactive session system 170 serves interactive sessions and data related to interactive sessions to users of user devices 130. The term "interactive session" is used in this specification to refer to a presentation that allows a user to experience an event or receive data related to the event. Events of different types can be presented. In some implementations, events may be "assistance" events, for which interactive sessions provide step-by-step assistance to users to accomplish a particular task, or events may be "experience" events, for which interactive sessions provide users with an experience of participating in an activity. An example interactive session for an assistance event is a session that describes a step-by-step process to build a computer. An example interactive session for an experience event is a session that provides the experience of driving a certain make and model of an automobile. The interactive session system 170 may also provide interactive sessions for other appropriate event types.

Furthermore, the data that the interactive session system 170 provides for an event may also differ based on the event type and based on the intent of the user. For example, interactive sessions for repair events may provide users with a list of tools and parts required to accomplish a task at the beginning of an interactive session. Likewise, a user may have implicitly or explicitly specified an intent for viewing an interactive session. The user may explicitly specify an intent, for example, by interacting with a user interface element that represents their intent. A user may implicitly specify an intent, for example, by submitting a search query that is related to the intent, or by requesting other information that is related to the intent. For example, a user request for information about purchasing tools needed to repair a computer may be considered an implicit indication of the user's intent to repair a computer.

The interactive session system 170 may also determine specific data to provide based on the intent. For example, a user that is viewing a session that describes building a computer, and with the intent to build the computer, may be presented with additional information, e.g., a list of parts, tools and the time required to complete the task. Another user that is watching the same session with the intent to learn about computers may be presented with other information, e.g., articles about memory, heat dissipation, or other computer related topics, in a side panel of a viewing environment as the interactive session is presented.

The interactive sessions can be created by assistants, such as expert assistants, or non-expert users. An "assistant" can be a user or entity that has been accepted by the system 170 for a category, e.g., as a result of the user's or entity's having provided credentials or demonstrated a high level of skill. An "expert assistant" may be an assistant with a high level of skill or expertise in a particular area. Examples of expert assistants include a licensed contractor for construction related videos or a company that produces sessions for a particular product the company manufactures and a user that has produced a large number of highly rated sessions. An assistant does not have to have a particular level of skill or have produced a large number of highly rated sessions. For example, an assistant may simply be a friend or acquaintance of another user that knows how to accomplish a task, such as programming a universal remote control. This assistant and the other user can participate in an interactive session where the assistant helps the other user program a universal remote control.

In some implementations, a content item management system (not shown) can provide content items with the interactive sessions. In the case of advertisements, the content item management system may select advertisements based on the subject matter of a session, the event type, and the user's intent. For example, for a repair event, the content item management system may provide advertisements for providers of tools and parts that are listed in the list of tools and parts required to accomplish the repair task.

The interactive session system 170 includes a user interface generator 172, an object identifier 174, and a user interface element index 176. The user interface generator 172 generates user interfaces based on an image or video feed. For example, the user interface generator 172 may generate a user interface based on an image or video feed of the workspace 101, as described in more detail below.

The object identifier 174 is used to identify objects depicted in an image or video. For example, the object identifier 174 may detect tools or other objects depicted in an image of the workspace 101. The objects can be detected using vision and image processing technologies. A label or annotation describing each detected object can be included in the user interface. For example, if a hammer is detected in an image or video, a label including "hammer" may be depicted in the user interface near the depiction of the hammer.

Production systems 140 can be used to create sessions. Production systems 140 may range from studios to smartphones to simple hand-held video recording systems. Generally, a production system 140 is a system that includes an audio input device 142, a video input device 144, a display device 146, and/or optionally other input and output devices and production processes that are used to create sessions. For example, post production processes may be used to add metadata to an interactive session. Such metadata may include, for example, keywords and topical information that can be used to classify the session to one or more topical categories; a list of tools and parts required for a particular session and descriptions of the tools and parts; and so on.

Tactical sensory input devices may also be used in a production system 140. For example, a particular interactive session may provide input data for a "G-suit" that applies pressure to a user's body and that the user interprets as simulated motion. Accordingly, appropriate input systems are used in the production system 140 to generate and store the input data for the interactive session.

Production systems 140 may also be or include devices that are attached to a person. For example, for "point of view" sessions, wearable computer devices that include a camera input device and microphone input device may be worn on a user's person during the time the user is creating the session.

A user experiences a session by use of a user device 130. Other types of input and output devices may also be used, depending on the type of interactive session. For example, an augmented reality visor that provides a view of a real-world environment augmented by computer-generated graphics may be used. A tactical sensory input device and a tactical sensory output device that applies pressure to a user's body and that the user interprets as simulated motion or other type of feedback may also be used.

Some interactive sessions may be provided as part of a consultation process, for example when the user cannot find a stored interactive session that fulfills the user's informational needs. To illustrate, an automobile mechanic may contact a user at another location, e.g., the user's home, to consult with the user regarding an automobile repair. The automobile mechanic may then explain to the user, by means of an interactive session that highlights certain parts of the automobile engine as seen from the point of view of the automobile mechanic, certain repairs that are necessary and request authorization from the user to proceed. The user can ask questions and discuss alternatives with the automobile mechanic during the interactive session to make an informed decision.

Although the interactive session system 170 is depicted as a separate system in FIG. 1, in some implementations the interactive session system 170 is part of the user system 130 and/or the production system 140. For example, the production system 140 and/or the user device 130 may include a user interface generator 172 that generates the user interfaces. In some implementations, the interactive session system 170 is a third party system accessed by the user device 130 and the production system 140. A third party interactive session system 170 may provide user interfaces to the user device 130 and the production system 140 so that the user of the user device 130 and the user of the production system 140 can interact with the interactive session system 170 and/or each other.

User Interfaces for Identifying Objects

As described above, a user may be presented with a list of parts, tools, or other objects that are required to complete a task during an interactive session. This can decrease the amount of time required to complete an interactive session as the user does not have to search for tools while the session is in progress. However, it may be difficult for an assistant to describe the tool or part required at a particular time. For example, there may be several versions of a screwdriver required during an interactive session. If the differences between the screwdrivers are not obvious, the assistant may resort to saying things like "the fifth tool from the left," or "you're getting warmer, but further to the left." This can be frustrating to the user and/or the assistant, and can lengthen the time required to complete the interactive session.

The interactive session system 170 can generate a user interface for a workspace 101 that makes it much easier for the assistant to point out objects to the user. For ease of subsequent discussion, the example environment 100 is described with reference to a user operating the user device 130 and being located at a first location, and an assistant operating the production system 140 at a second location remote from the first location. For example, the user may be located at the user's residence in one state, while the assistant may be located at a residence or work location in a different state.

In some implementations, the user organizes a workspace 101 with tools, parts, and other objects that are required to complete an interactive session, for example based on a list presented to the user. The example workspace 101 includes a wrench 103a, a screwdriver 103b, and another screwdriver 103c. The workspace 101 also includes, for each object, an indicator element 104a-104c that is used to identify the object. The indicator elements 104a-104c can also be placed near the objects by the user.

An indicator element 104a-104c can include a visual code 106a, an indicator 108a, a control module 110a, and a wireless communication device 112a. An indicator element 104a-104c can also include an energy source, such as a battery, for powering the indicator 108a-108c, the control module 110a-110c, and the wireless communication device 112a-112c. The visual codes 106a-106c can be QR codes, bar codes, numbers, alpha-numeric codes, or other types of identifiable objects. Typically, the visual code 106a for an indicator element 104a is unique to that indicator element 104a. In this way, each object 103a-103c is associated with a unique visual code 106a-106c, respectively. The indicator elements 104a-104c can be configured to stand on the workspace 101 such that the visual codes 106a-106c are visible to the video input device 134.

The indicators 108a-108c can include a light, such as a light-emitting diode (LED), a speaker, or other object that can be used to draw a user's attention to the indicator element 104a-104c. As described below, when the assistant wants the user to make use of a particular object, such as the wrench 103a, the assistant can cause the indicator 108a to activate, drawing the user's attention to the object.

The wireless communication devices 112a-112c are used to register their indicator elements 104a-104c with the interactive session system 170. To register with the interactive session system 170, each wireless communication device 112a-112c can send data identifying the indicator element 104a-104c and/or the visual code 106a-106c to the user device 130. In turn, the user device 130 can provide the data to the interactive session system 170.

Each indicator element 104a-104c can have a unique identifier, e.g., ID number that uniquely identifies the indicator element 104a-104c. This unique identifier can be sent to the interactive session system 170 during the registration process. For each indicator element 104a-104c, the interactive session system 170 may store its identifier and/or its visual code so that the interactive session system 170 can associate the indicator element with the proper user interface element.

The wireless communication devices 112a-112c are also used to receive a command signal for activating the indicators 108a-108c. When the command signal is received by a wireless communication device 112a, the wireless communication device 112a provides a signal to its control module 110a indicating receipt of the command signal. In turn, the control module 110a activates the indicator 108a. The control modules 110a-110c can be configured to activate their indicators 108a-108c for a predetermined amount of time, or until a signal is received by the wireless communication device 112a-112c to deactivate the indicator 108a-108c.

The user interface generator 172 generates user interfaces, such as the example user interface 150, and provides the user interfaces to production systems 140 of assistants, or other users. In general, the user interfaces enable assistants to select objects 103a-103c in order to activate the indicator 108a-108c associated with the object 103a-103c. To generate a user interface, the user interface generator 172 receives an image or video feed of a workspace 101, for example from the video input device 134 of the user device 130. The image or video feed depicts the objects 103a-103c arranged on the workspace 101 and the indicator elements 104a-104c positioned near each of the objects 103a-103c.

A user interface created by the user interface generator 172 can include an image or video of the workspace 101, including the objects 103a-103c and the indicator elements 104a-104c. For example, the user interface 150 includes depictions of a wrench 151a, a screwdriver 151b, and another screwdriver 151c, which correspond to the wrench 103a, the screwdriver 103b, and the screwdriver 103c of the workspace 101, respectively.

Figure 4:
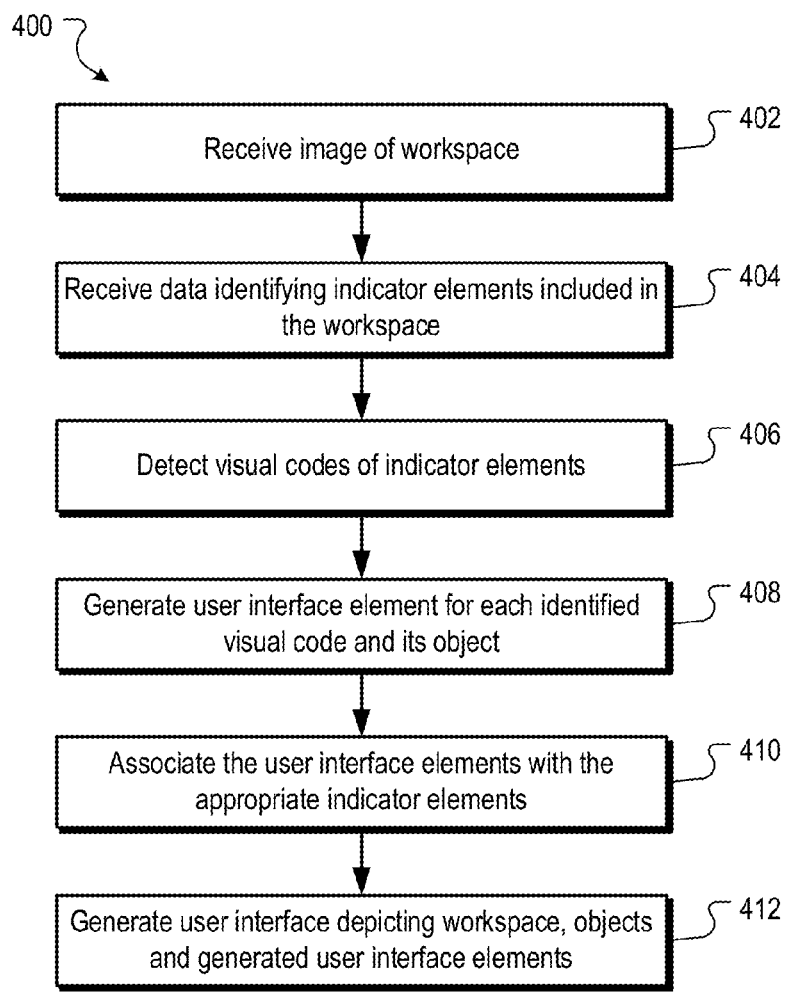
FIG. 4 is a flow chart of an example process for generating a user interface depicting a workspace and user interface elements for objects included in the workspace.

The user interface generator 172 also creates user interface elements 154a-154c for each indicator element 104a-104c. In general, a user interface element 154-154c enables the assistant to select the object 103a-103c associated with the user interface element 154a-154c, and cause the indicator 108a for the object 103a-103c to activate. For example, if the assistant wanted the user to pick up the screwdriver 103b, the assistant could select the user interface element 154b. In turn, the production system 140 sends a command signal to the user device 130, e.g., by way of the interactive session system 170, and the user device 130 activates the indicator 108b by sending a command signal to the wireless communication device 112b. An example process for generating a user interface is illustrated in FIG. 4 and described below.

The example user interface elements 154-154c each includes a selectable icon 155a and optionally a depiction 156a-156c of the visual code 106a-106c for its corresponding indicator element 104a-104c. When selected, a selectable icon 155a causes the production system 140 to send the command signal to the user device 130. The selectable icons 155a-155c can be selected by point and click using a mouse or other pointer, or by an assistant touching a touchscreen at the selectable icons 155a-155c.

In some implementations, each user interface element 154a-154c includes an "On" icon and an "Off" icon. This allows the assistant to selectively turn the indicators 108a-108c on and off. For example, if the assistant selects an "On" icon for the wrench 103a, the production system 140 may send a command to the signal to the user device 130 to turn the indicator 108a on. Similarly, if the assistant selects the "Off" icon for the wrench 103a, the production system 140 may send a command to the signal to the user device 130 to turn the indicator 108a off.

The interactive session system 170 can maintain an index of user interface elements 154a-154c in the user interface element index 176. The user interface element index 176 can include data identifying each user interface element 154a-154c included in a user interface 150 and, for each user interface element 154a-154c, data identifying its corresponding indicator element 104a-104c. For example, the data identifying an indicator element 104a-104c may include the unique identifier for the indicator element 104a-104c. This index can be used to map data identifying a selected user interface element 154a-154c to its corresponding indicator element 104a-104c.

The user interface generator 172 can generate user interfaces that accept other forms of input in addition to, or in place of, selectable icons. In some implementations, the production system 140 includes or is communicably coupled to an eye tracking device. The eye tracking device can determine the direction in which the assistant is looking and cause indicators 108a-108c to activate based on this direction. For example, if the eye tracking device determines that the assistant is looking at the depiction of the wrench 151a in the user interface 150, the production system 140 can use this data to cause the indicator 108a to activate.

The eye direction can be used in combination with other signals. For example, the eye direction may be used in combination with a timer. If the production system 140 determines, in combination with the eye tracking device, that the assistant has been looking at the depiction of the wrench 151a for at least a threshold amount of time, e.g., two seconds, the production system 140 may cause the indicator 108a to activate. The eye direction may also be used in combination with a voice command, such as "activate." For example, while the assistant is looking at the depiction of the wrench 151a, the assistant may speak the command "activate." The production system 140 can detect the command, e.g., by way of the audio input device 142, and in response, cause the indicator 108a to activate.

In some implementations, the production system 140 and/or the interactive session system 170 accepts voice commands without eye tracking. For example, voice associations between the assistant and the objects 151a-151c depicted in the user interface 150 may be used to activate the indicators 108a-108c. The voice associations can be learned before or during an interactive session. For example, during the interactive session, the assistant may say "pick up the ¾" wrench" and select the icon 155a for the wrench 103a. The interactive sessions system 170 can then associate the command "¾ wrench" or "pick up the ¾" wrench" with the user interface element 154a, and thus the indicator element 104a. Before the interactive session, the assistant can train the interactive session system 170 by selecting the appropriate icon 155a-155c and recording a corresponding command. Thereafter, when a command associated with one of the indicator elements 155a-155c is spoken, the production system 140 and/or the interactive session system 170 can cause the corresponding indicator 108a-108c to activate. The voice associations for each user interface element 154a-154c can also be stored in the user interface element index 176 with a reference to its corresponding user interface element 154a-154c.

In some implementations, the user interface is based on a video feed of the workspace 101 rather than a still image. For example, the user interface generator 172 may receive a video feed from the user device 130, generate user interface elements 154a-154c for each indicator element 104a-104c depicted in the video feed, and superimpose the user interface elements 154a-154c on a reproduction of the video feed to create the user interface 150. If the video input device 132 moves, the user interface generator 172 can also move the user interface elements 154a-154c to keep them near the corresponding indicator elements 104a-104c in the video feed.

The interactive session system 170 can also help train the user as to what each tool or part is. Before an interactive session begins, the user places the appropriate objects 103a-103c and an indicator element 104a-104c for each object on the workspace 101. For each object, the user can record a description of the object using the audio input 132 of the user device 130. For example, the interactive session system 170 may provide a user interface to the user device 130. This user interface may include an icon that enables the user to select each indicator element 104a-104c and record a description for the object associated with that indicator element. For example, the user interface may be similar to the user interface that is presented at the production system 140. When the description is recorded, the interactive session system 170 can associate the description with its corresponding indicator element 104a-104c. When the assistant selects an object during an interactive session, the interactive session system 170 can cause the user device 130 to play the description for the selected object. For example, the user may describe the screwdriver 103c as a "Philips-head screwdriver." When the assistant selects the user interface element 154c for the screwdriver 103c, the user will hear the recorded description "Philips-head screwdriver" played by the user device 130, in addition to the indicator 108c for the screwdriver 103c being activated.

Using Laser(s) to Identify Objects

Figure 2:
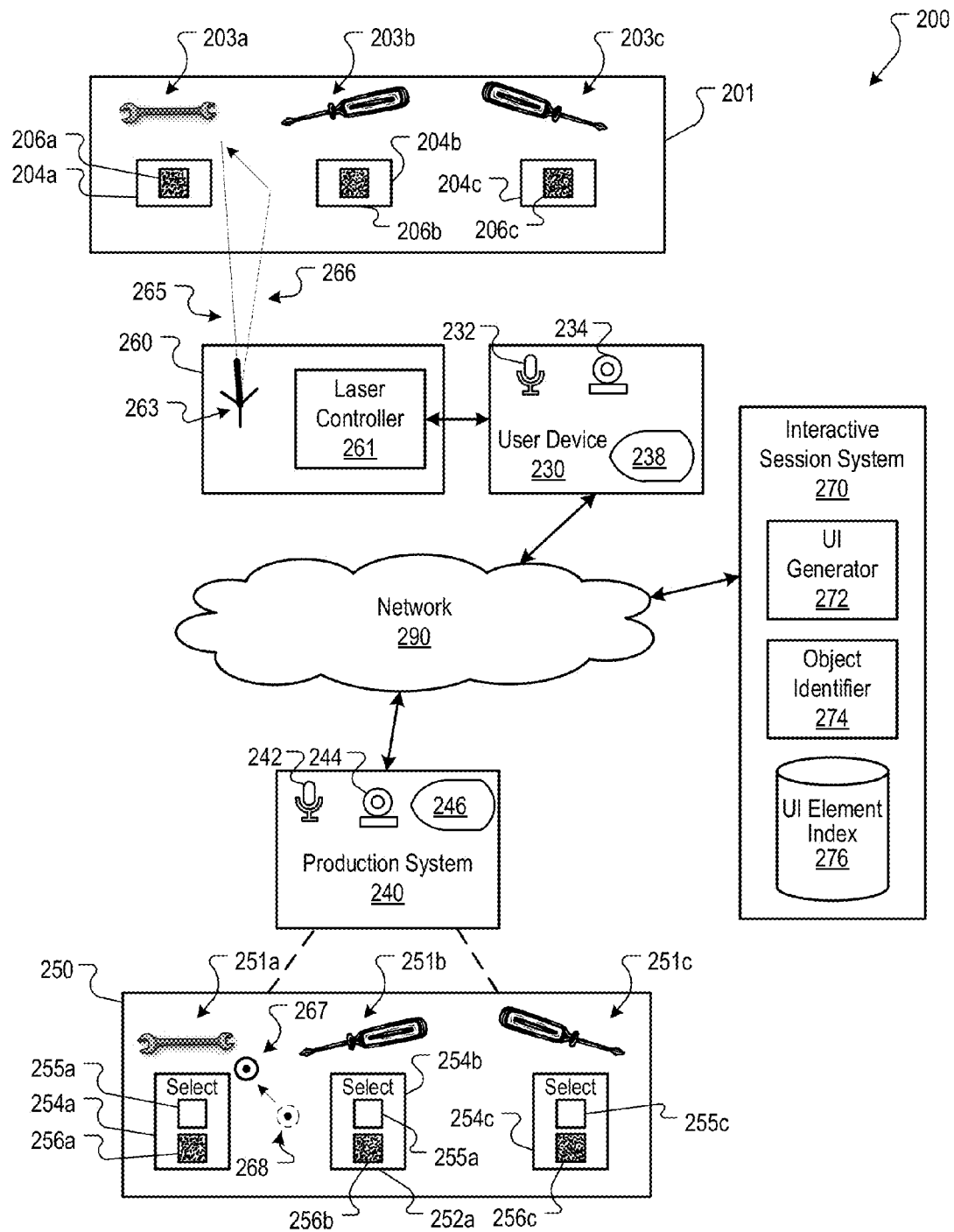
FIG. 2 is another example environment in which an interactive session system provides a user interface for identifying objects at a remote location.

FIG. 2 is another example environment 200 in which an interactive session system 270 provides a user interface for identifying objects at a remote location. The environment 200 includes many components similar to those of the environment 100 of FIG. 1. For example, the environment 200 includes a workspace 201 that includes objects 203a-203c and indicator elements 204a-204c that each includes a visual code 206a-206c.

The environment 200 also includes a user device 230, a production system 240, an interactive session system 270, and a network 290, which can be substantially the same as or similar to the user device 130, the production system 140, the interactive session system 170, and the network 190 of FIG. 1, respectively. For example, the user device 230 includes an audio input device 232, a video input device 234 and/or still image input device, an optional display device 238, and/or optionally other input devices and output devices. Similarly, the production system 240 includes an audio input device 242, a video input device 244, a display device 246, and optionally other input devices and production processes that are used to create sessions.

The interactive session system 270 includes a user interface generator 272, an object identifier 274, and user interface element index 276. Similar to the interactive session 170 of FIG. 1, the interactive session system 270 generates user interfaces, such as the user interface 250, based on images or video feeds of the workspaces. The example user interface 250 included depictions of the tools 251a-251c and user interface elements 254a-254c that each includes a selectable icon 255a-255c and optionally the visual code 256a-256c of its corresponding indicator element 204a-204c.

The example environment 200 also includes a laser system 260. The laser system 260 includes a laser controller 261 and a laser 263. The laser 263 is used to highlight objects or locations, e.g., a particular spot or place on a workspace, selected at the user interface 250 in place of, or in addition to, the use of indicator elements. To highlight an object or location, the laser controller 261 can cause the laser to pan and/or tilt until the laser 261 directs its beam at the selected object or location.

In operation, the production system 240 can transmit command data identifying a selected user interface element 254a-254c or its corresponding indicator element 204a-204c to the user device 230, for example by way of the interactive session system 270. In response, the user device 230 can interact with the laser controller 261 to direct the laser 263 at the object 203a-203c that corresponds to the selected user interface element 254a-254c.

A feedback loop can be used to help guide the laser 263 to the appropriate object 203a-203c. In some implementations, the interactive session system 270, or one of the other systems, can monitor the location of a dot or line produced by the laser's beam 265 on the workspace 201 as the laser 263 is guided into position. The location of the dot or line can be captured by the video input device 234 and displayed in the user interface 250, as illustrated by the icon 267.

As the laser 263 pans and tilts to redirect its beam 265, the interactive session system 270 can compute the vertical and/or horizontal distance between the location of the dot or line and the destination at the selected object 203a-203c. These distances can be with respect to the user interface 250. For example, the interactive session system 270 may compute the distances in terms of pixels. Based on the computed distances, the interactive session system 270 can provide data to the user device 230 to continue guiding the laser 263 to the selected object. Once the laser 263 is directed to the selected object, the interactive session system 270 can provide data to the user device 230 to cause the laser 263 to remain in that position.

The example user interface 250 illustrates the movement of the laser's beam 265 from a position 266 on the workspace 201 to its current position near the wrench 203a. In particular, the user interface 250 includes an icon 268 displaying the position 266 and the icon 267 displaying its current position.

Detecting a red laser dot can be difficult for some cameras as the cameras interpret the dot as a bright white light because it overloads the camera's sensor. To counteract this, two lasers can be used. For example, the two lasers, e.g., one green laser and one red laser, can be directed at the same position. If this position cannot be detected through the video feed, one of the lasers can be moved away from the original position and then moved back. If the movement of the laser from the original position is detected, for example by detecting another bright spot where the laser has been moved to, then the original position can be considered the location of the lasers. Two lasers can also be used to project a pattern that can be more readily recognized in the video feed. For example, two lasers may be used to project a crosshairs-like pattern onto the workspace 201.

In some laser-based implementations, indicator elements 204a-204c may be omitted. The user interface may display the workspace 201 and the objects 203a-203c. To select one of the objects 203a-203c or a location depicted by the user interface, the assistant may select a point on the user interface at or near a desired object 203a-203c or location. For example, the assistant may touch a touchscreen at the desired location or click a mouse at the desired location. In response, the production system 240 may interact with the interactive session system 270 and/or the user device 230 to direct the laser 263 at a location of the workspace 201 that corresponds to the selected location of the user interface 250. For example, if the assistant selects the user interface 250 at the depiction 251c of the screwdriver 203c, the production system 240 may interact with the interactive session system 270 and/or the user device 230 to direct the laser 263 at the screwdriver 203c. A feedback loop can be used as described above to direct the laser 263 to the screwdriver 203c.

Example Process for Generating an Image of a Workspace

Figure 3:
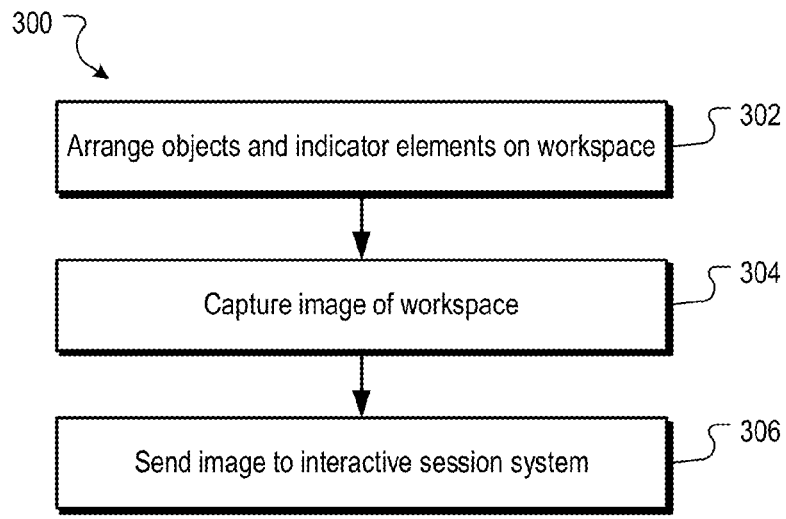
FIG. 3 is a flow chart of an example process for capturing an image of a workspace and sending the image to an interactive session system.

FIG. 3 is a flow chart of an example process 300 for capturing an image of a workspace and sending the image to an interactive session system. Operations of the process 300 can be implemented, for example, by one or more data processing apparatus, such as the user device 130 of FIG. 1 or the user device 230 of FIG. 2. The process 300 can also be implemented as instructions stored on computer storage medium such that execution of the instructions by a data processing apparatus cause the data processing apparatus to perform the operations of the process 300.

Objects and indicator elements are arranged on a workspace or other location (302). For example, a user planning to participate in an interactive session may be presented with a list of tools, parts, and other objects that are required for the interactive session. The user may place the objects specified by the list on the workspace.

The user may also place an indicator element, similar to the indicator element 104a of FIG. 1 or the indicator element 204a of FIG. 2, near each object on the workspace. For example, the user may have received a set of indicator elements for use in interactive sessions. As the user interface generator 172 associates the indicator elements with user interface elements irrespective of the identity of the objects, the user can randomly place the indicator elements near the objects. That is, the user does not have to place a certain indicator element near a particular object.

An image is captured of the workspace, including the objects and the indicator elements (304). For example, the user may use the video input device 132 of the user device 130 to capture a still image of the workspace. The user device 130 sends the captured image to the interactive session system 170 (306).

In some implementations, rather than sending a still image to the interactive session system 170, the user device 130 may provide a video feed to the interactive session system 170. The interactive session system 170 can capture a still image of the workspace from the video feed. Or, the interactive session system may create the user interface using the video feed rather than a still image.

Example Process for Generating a User Interface

FIG. 4 is a flow chart of an example process 400 for generating a user interface depicting a workspace and user interface elements for objects included in the workspace. Operations of the process 400 can be implemented, for example, by one or more data processing apparatus, such as the interactive session system 170 of FIG. 1 or the interactive session system 270 of FIG. 2. The process 400 can also be implemented as instructions stored on computer storage medium such that execution of the instructions by a data processing apparatus cause the data processing apparatus to perform the operations of the process 400. For ease of discussion, the process is described with reference to the interactive session system 170 and the environment 100.

An image of a workspace, such as the workspace 101, is received (402). For example, the interactive session system 170 may receive the image from the user device 130 as described above with reference to FIG. 3. The image may depict objects 103a-103c and indicator elements 104a-104c arranged on the workspace 101. The image may also depict the visual codes 106a-106c of the indicator elements 104a-104c.

Data identifying indicator elements 104a-104c included in the workspace are received (404). As described above, the indicator elements 104a-104c include wireless communication devices 112a-112c, respectively. When active, e.g., powered on, each wireless communication device 112a-112c may transmit data identifying its indicator element 104a-104c, for example to the user device 130 during a registration process. In turn, the user device 130 can provide the received data to the interactive session system 170. The data identifying the indicator element 104a-104c can include its unique identifier.

The visual codes 106a-106c of the indicator elements are identified from the image (406). For example, the user interface generator 172, or another subsystem, can process the image to identify each visual code 106a-106c in the image. The user interface generator 172 can generate a list of visual codes found in the image. If the visual codes are QR codes or barcodes, the unique identifier for the indicator element 104a-104c may be stored in the code. When the code is scanned, the user interface generator 172 can receive the unique identifier and generate a list of unique identifiers for the workspace 101.

A user interface element 154a-154c is generated for each visual code 106a-106c identified in the image (408). As described above, a user interface element 154a-154c can be used to activate the indicator 108a-108c of an indicator element 104a-104c. For each visual code 106a-106c, the user interface generator 172 can generate a user interface element 154a-154c that includes a selectable icon 155a-155c that allows an assistant to activate the indicator 108a-108c.

The user interface elements 154a-154c are associated with their corresponding indicator elements 104a-104c (410). As each indicator element 104a-104c is associated with a unique identifier, the user interface generator 172 can associate each user interface element 104a-104c with the unique identifier of the appropriate indicator element 154a-154c. For example, the user interface generator 172 may associate the unique identifier for the indicator element 154a with the user interface element 104a. Similarly, the user interface generator 172 may associate the unique identifier for the indicator element 154b with the user interface element 104b. In this way, when a user interface element 154a-154c is selected, the interactive session system 170 can identify the appropriate indicator element for activation.

A user interface is generated (412). The user interface generator 172 can generate a user interface based on the received image and the generated user interface elements 154a-154c. For example, the user interface generator 172 can generate a user interface that depicts the objects 103a-103c included in the workspace 101 and the user interface elements 154a-154c, similar to the user interface 150 of FIG. 1.

The user interface elements 154a-154c can be disposed near their corresponding indicator elements 104a-104c and/or near their corresponding objects 103a-103c. In the example user interface 150, the indicator element 154a is positioned below its corresponding object, the wrench 103a. Similarly, the indicator element 154b is positioned below its corresponding object, the screwdriver 103b.

Once generated, the user interface 150 may be transmitted to the production system 140. The expert assistance can then activate indicators 108a-108c by selecting the corresponding user interface elements 154a-154c at the user interface 150.

Example Process for Activating an Indicator

Figure 5:
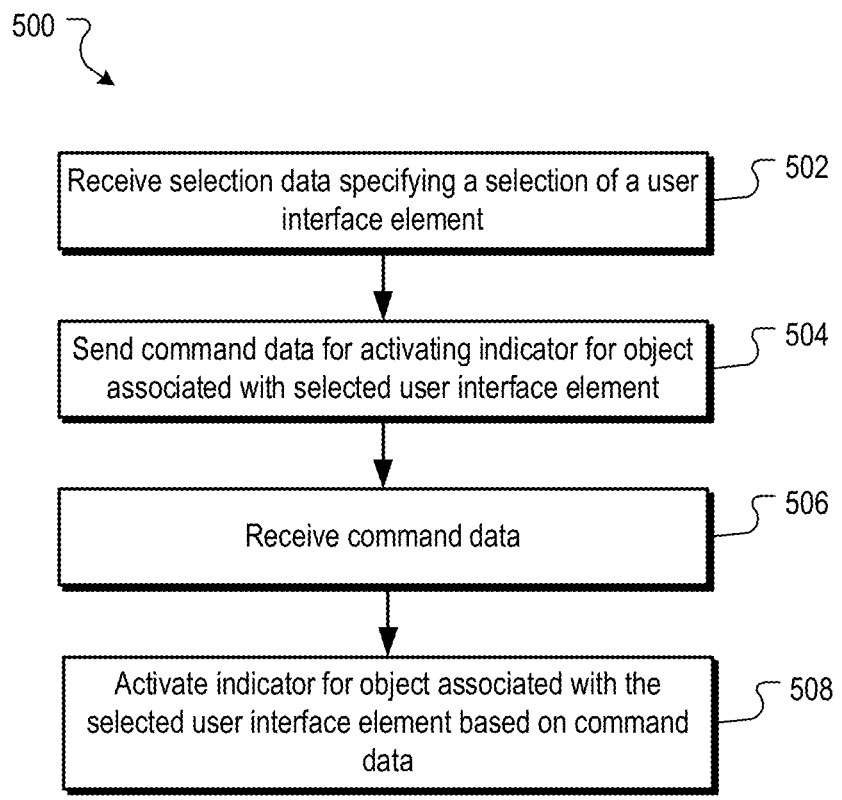
FIG. 5 is a flow chart of an example process for activating an indicator for an object.

FIG. 5 is a flow chart of an example process 500 for activating an indicator for an object. Operations of the process 500 can be implemented, for example, by one or more data processing apparatus, such as the production system 140 and/or the user device 130. The process 500 can also be implemented as instructions stored on computer storage medium such that execution of the instructions by a data processing apparatus cause the data processing apparatus to perform the operations of the process 500.

Selection data specifying selection of a user interface element is received (502). For example, the production system 140 may present a user interface, such as the user interface 150 that depicts objects 151a-151c of a workspace 101 and user interface elements 154a-154c. The assistant may select one of the user interface elements 154a-154c, for example using a mouse or touching a touchscreen at the user interface element 154a-154c. In turn, the production system 140 can receive data from the user interface 150 that identifies the selected user interface element 154a-154c.

Command data for activating an indicator is transmitted (504). In response to receiving the data specifying a selection of a user interface element 154a-154c, the production system 140 can send command data to the user device 130. For example, the production system 140 may send the command data to the user device 130 by way of the interactive session system 170, or directly to the user device 130 bypassing the interactive session system 170.

The command data can identify the selected user interface element 154a-154c and/or a unique identifier of an indicator element 104a-104c that corresponds to the selected user interface element 154a-154c. For example, the production system 140 may receive, for the user interface 159 and from the user interface element index 176, an index that identifies each user interface element 154a-154c of the user interface 150 and for each user interface element 154a-154c, the indicator element 104a-104c that corresponds to the user interface element 154a-154c. This index would specify that the user interface element 154a corresponds to the indicator element 104a.

By way of another example, the production system 140 can send command data that specifies the selected user interface element 154a-154c to the interactive session system 170. In turn, the interactive session system 170 can access the user interface element index 176 to identify the indicator element 104a-104c that corresponds to the selected user interface element 154a-154c.

By way of yet another example, the production system 140 can send command data identifying the visual code 108a-108c associated with the selected user interface element 154a-154c to the interactive session system 170. The interactive session system 170 can determine the corresponding indicator element 104a-104c based on the identified visual code.

The command data is received (506). For example, the user device 130 may receive the command data from the production system 140 and/or the interactive session system 170. If the command data specifies the selected user interface element 154a-154c, rather than its corresponding indicator element 104a-104c, the user device 130 can identify the corresponding indicator element 104a-104c using the user interface element index 176 and the information identifying the selected user interface element 154a-154c. For example, the user device 130 can compare the selected user interface element 154a-154c to the user interface element index 176 to identify the corresponding indicator element.

In response to receiving the command data, the user device 130 causes the indicator 108a-108c of the indicator element 104a-104c that corresponds to the selected user interface element 154a-154c to activate (508). To activate the indicator 108a-108c, the user device 130 can send command data to the wireless communication device 112a-112c of the indicator element 104a-104c. For example, if the assistant selected the user interface element 154c for the screwdriver 103c, the user device 130 can send command data to the wireless communication device 112c. In turn, the wireless communication device 112c can send data to the control module 110c and the control module 110c can activate the indicator 108c.

Example Process for Identifying an Object with a Laser

Figure 6:
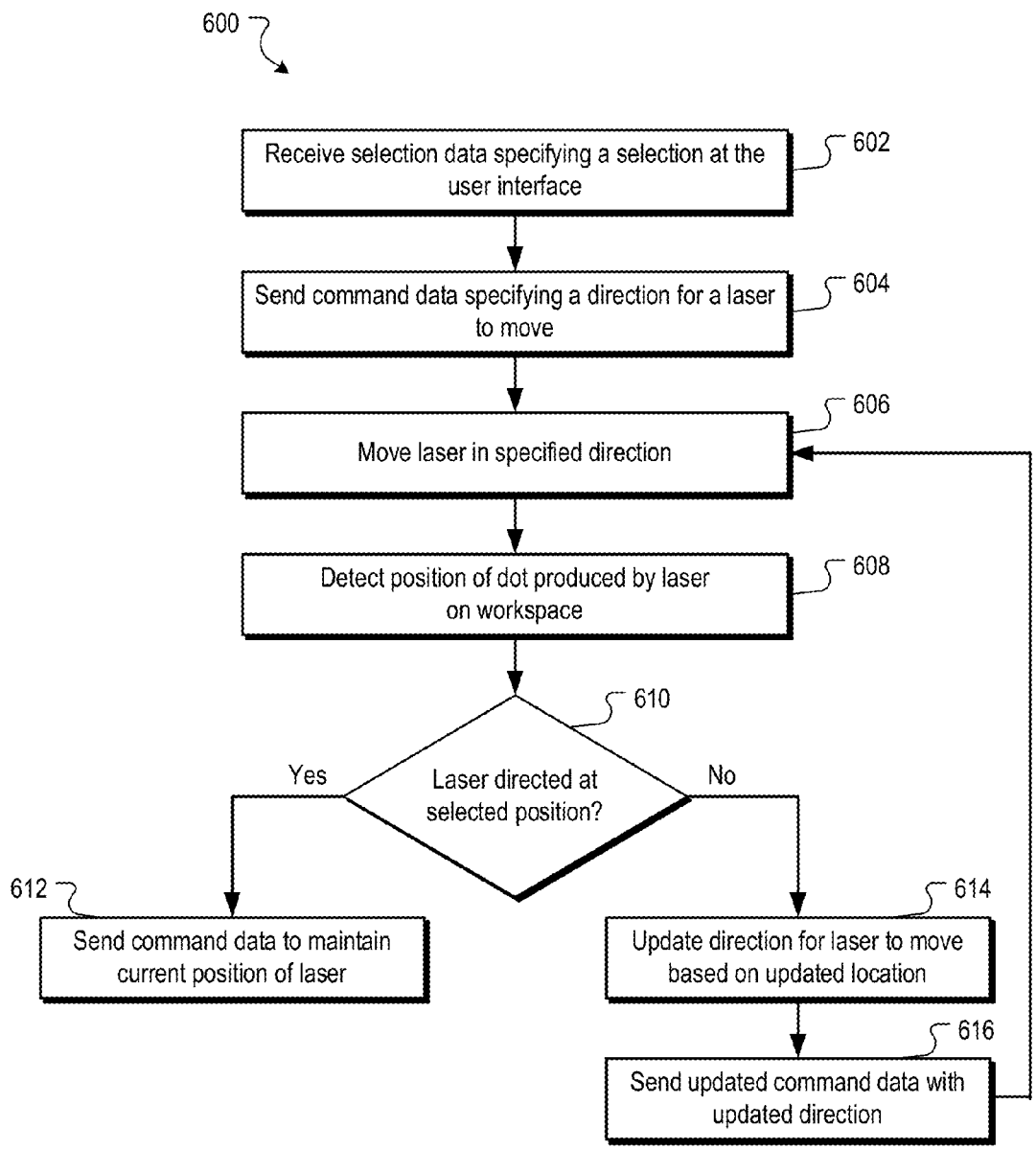
FIG. 6 is a flow chart of an example process for highlighting an object with a laser.

FIG. 6 is a flow chart of an example process 600 for highlighting an object or location with a laser. Operations of the process 600 can be implemented, for example, by one or more data processing apparatus, such as the production system 240, the user device 230, and/or the interactive session system 270. The process 600 can also be implemented as instructions stored on computer storage medium such that execution of the instructions by a data processing apparatus cause the data processing apparatus to perform the operations of the process 600.

Selection data specifying a selection at a user interface is received (602). An assistant may select a point on the user interface that corresponds to an object or desired area to which the assistant wants to direct a user's attention. For example, the assistant may touch a touchscreen at the location of the depiction 251c of the screwdriver 203c in the user interface 250. By way of another example, the assistant may select a user interface element 254a-254c for an object. By way of yet another example, the assistant may select a point on the user interface that corresponds to a place at the workspace where the assistant wants the user to place an object. The production system 240 may receive the selection data identifying the location of the selection and provide data specifying the location to the interactive session system 270.

Command data specifying a direction for a laser to move is transmitted (604). For example, the interactive session system 270 may have information identifying the current direction in which the laser is pointing based on detecting a dot made by the laser's beam on the workspace 201. The interactive session system 270 can compute the vertical and horizontal distance between the current position of the laser's beam and the position identified by the selection data. Based on the computed distances, the interactive session system 270 can determine the direction in which the laser needs to move in order to direct its beam at a location of the workspace 201 that corresponds to the location selected at the user interface 250. The interactive session system 270 can provide command data specifying the direction for the laser to move to the user device 230.

The laser 263 is moved in the specified direction (606). The user device 230 can interact with the laser controller 261 to move the laser 263 in the specified direction. In response, the laser controller 261 can cause the laser 263 to move in the specified direction.

The position of a dot produced by the laser's beam on the workspace is detected (608). The position may be detected by the interactive session system 270 periodically while the laser 263 is being moved in the specified direction. The position of the dot can be determined based on its depiction in the video feed received from the video input device 234 of the user device 230.

A determination is made whether the dot produced by the laser's beam is at the selected position (610). The determination can be made by the interactive session system 270 comparing the location of the dot produced by the laser's beam to the location of the user interface selected by the assistant.

If it is determined that the dot produced by the laser's beam is at the selected position, command data is sent to cause the laser 263 to maintain its current position (612). For example, the interactive session system 270 may send command data to the user device 130 to maintain the laser's current position. In turn, the user device 230 can interact with the laser controller 261 to maintain the laser's current position.

If it is determined that the dot produced by the laser 263 is not located at the selected position, the direction for the laser 263 to move can be updated to direct the laser 263 at the selected location (614). For example, the interactive session system 270 can re-compute the vertical and horizontal distances between the current position of the laser's beam and the position identified by the selection data. Based on the computed distances, the interactive session system 270 can update the direction for the laser 263 to move.

Updated command data can be transmitted (616). The updated command data can include the updated direction for the laser 263 to move. The interactive session system 270 can send the updated command data to the user device 230. In response, the user device 230 can interact with the laser controller 261 to move the laser 263 in the specified direction.

Additional Implementation Details

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices.

Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, comprising:
   receiving an image of a first location, the image depicting a layout of objects located at the first location and one or more barcodes that are each associated with at least one of the objects;
   generating, for display at a second location that is remote from the first location, a user interface for the first location using the received image and the one or more barcodes depicted in the image, the user interface depicting the layout of objects and an icon for each object that has an associated barcode, each icon being selectable to identify the object associated with the barcode, wherein generating the user interface for the first location using the received image and the one or more barcodes depicted in the image comprises:
   for each object that has an associated barcode:
      identifying the barcode from the image,
      generating the icon for the object in response to identifying the barcode, and
      positioning the icon for the object near a depiction of the object in the user interface;
   providing the user interface for display at a display located at the second location;
   receiving selection data specifying a selection of a particular icon for a particular object displayed in the user interface; and
   sending command data to a computer located at the first location in response to receiving the selection data, the command data causing the computer to highlight the particular object.

2. The method of claim 1, wherein the computer highlights the particular object by activating an indicator for the particular object.

3. The method of claim 2, wherein the indicator comprises a light positioned near the particular object.

4. The method of claim 1, wherein the command data comprise data identifying the indicator for the particular object.

5. The method of claim 1, wherein:
the command data comprise data identifying the barcode of the selected icon,
the computer identifies the indicator for the particular object based on the barcode identified by the command data, and
the computer activates the indicator in response to identifying the indicator.

6. The method of claim 1, wherein generating the user interface for the first location using the received image and the one or more barcodes depicted in the image comprises:
detecting the objects in the received image; and
providing a label for each detected object in the user interface.

7. The method of claim 1, wherein the visual barcode comprises a Quick Response Code.

8. The method of claim 1, wherein providing the user interface for display at a display located at the second location comprises providing data to a second computer located at the second location, the second computer displaying the user interface.

9. The method of claim 1, further comprising:
receiving an image that depicts a portion of the first location, the image further depicting each object associated with an icon; and
generating the user interface using the received image.

10. The method of claim 1, wherein:
the indicator comprises a laser; and
the command data causes the laser to direct a beam at the particular object.

11. The method of claim 10, further comprising:
detecting a position of the laser's beam in an image of the first location; and
updating the command data based on the detected position.

12. A system, comprising:
a processing apparatus;
a memory storage apparatus in data communication with the data processing apparatus, the memory storage apparatus storing instructions executable by the data processing apparatus and that upon such execution cause the data processing apparatus to perform operations comprising:
receiving an image of a first location, the image depicting a layout of objects located at the first location and one or more barcodes that are each associated with at least one of the objects;
generating, for display at a second location that is remote from the first location, a user interface for the first location using the received image and the one or more barcodes depicted in the image, the user interface depicting the layout of objects and an icon for each object that has an associated barcode, each icon being selectable to identify the object associated with the barcode, wherein generating the user interface for the first location using the received image and the one or more barcodes depicted in the image comprises:
for each object that has an associated barcode:
identifying the barcode from the image,
generating the icon for the object in response to identifying the barcode, and
positioning the icon for the object near a depiction of the object in the user interface;
providing the user interface for display at a display located at the second location;
receiving selection data specifying a selection of a particular icon for a particular object displayed in the user interface; and
sending command data to a computer located at the first location in response to receiving the selection data, the command data causing the computer to highlight the particular object.

13. The system of claim 12, wherein the computer highlights the particular object by activating an indicator for the particular object.

14. The system of claim 13, wherein the indicator comprises a light positioned near the particular.

15. The system of claim 12, wherein the instructions upon execution cause the data processing apparatus to perform further operations comprising:
receiving an image that depicts a portion of the first location, the image further depicting each object associated with an icon; and
generating the user interface using the received image.

16. The system of claim 12, wherein:
the indicator comprises a laser; and
the command data causes the laser to direct a beam at the particular object.

17. The system of claim 16, wherein the instructions upon execution cause the data processing apparatus to perform further operations comprising:
detecting a position of the laser's beam in an image of the first location; and
updating the command data based on the detected position.

18. A non-transitory computer storage medium encoded with a computer program, the program comprising instructions that when executed by data processing apparatus cause the data processing apparatus to perform operations comprising, comprising:
receiving an image of a first location, the image depicting a layout of objects located at the first location and one or more barcodes that are each associated with at least one of the objects;
generating, for display at a second location that is remote from the first location, a user interface for the first location using the received image and the one or more barcodes depicted in the image, the user interface depicting the layout of objects and an icon for each object that has an associated barcode, each icon being selectable to identify the object associated with the barcode, wherein generating the user interface for the first location using the received image and the one or more barcodes depicted in the image comprises:
for each object that has an associated barcode:
identifying the barcode from the image,
generating the icon for the object in response to identifying the barcode, and
positioning the icon for the object near a depiction of the object in the user interface;
providing the user interface for display at a display located at the second location;
receiving selection data specifying a selection of a particular icon for a particular object displayed in the user interface; and
sending command data to a computer located at the first location in response to receiving the selection data, the command data causing the computer to highlight the particular object.

19. The non-transitory computer storage medium of claim 18, wherein the computer highlights the particular object by activating an indicator for the particular object.

20. The non-transitory computer storage medium of claim 19, wherein:
 the indicator comprises a laser; and
 the command data causes the laser to direct a beam at the particular object.

* * * * *